No. 836,314. PATENTED NOV. 20, 1906.
J. DE S. FREUND.
CHARGING SYSTEM FOR STORAGE CELLS OR BATTERIES.
APPLICATION FILED JUNE 10, 1905.
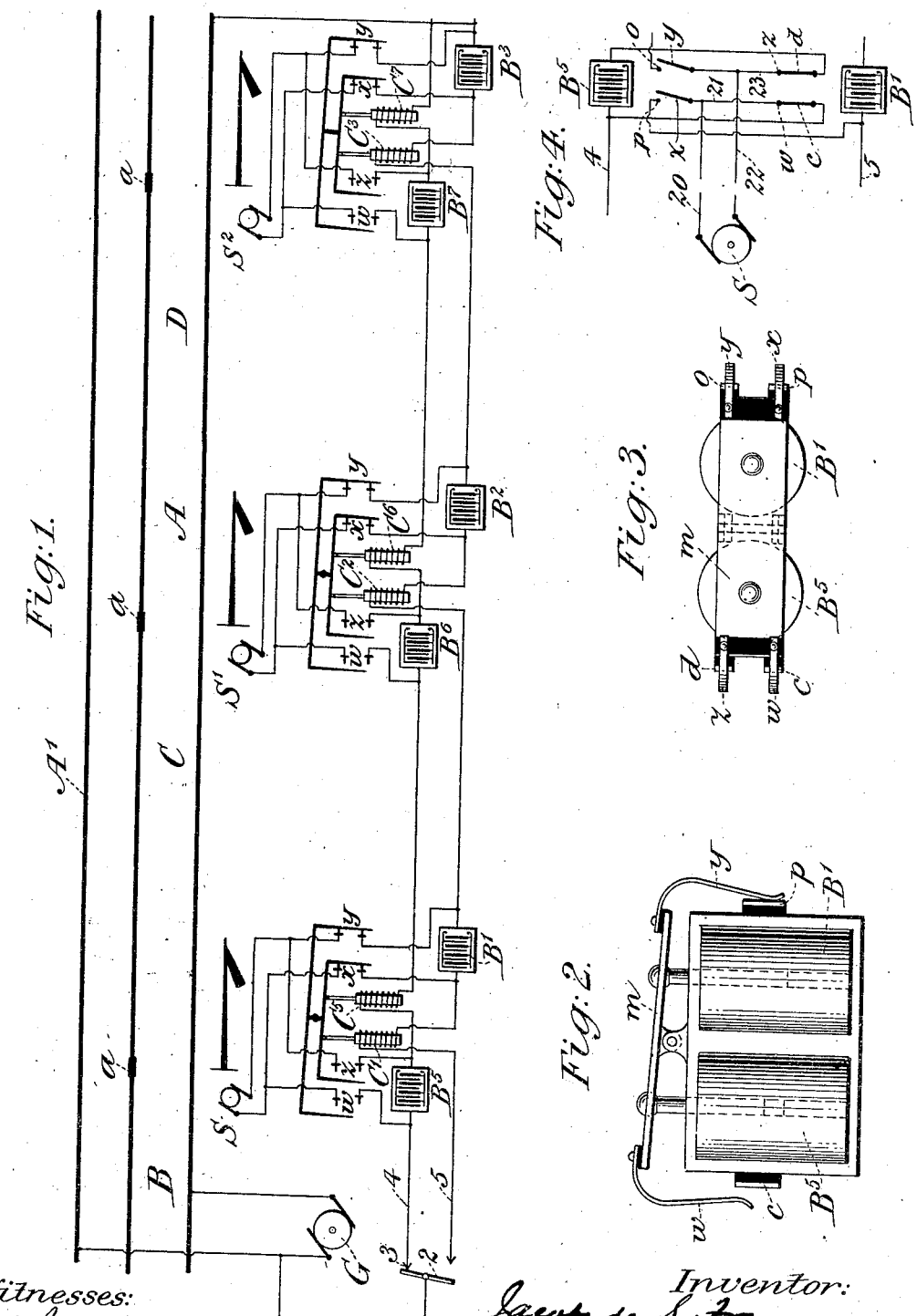

UNITED STATES PATENT OFFICE.

JACOB DE S. FREUND, OF EDGEWOOD PARK, PENNSYLVANIA, ASSIGNOR TO THE UNION SWITCH AND SIGNAL COMPANY, OF SWISSVALE, PENNSYLVANIA, A CORPORATION OF PENNSYLVANIA.

CHARGING SYSTEM FOR STORAGE CELLS OR BATTERIES.

No. 836,314.      Specification of Letters Patent.      Patented Nov. 20, 1906.

Application filed June 10, 1905. Serial No. 264,730.

*To all whom it may concern:*

Be it known that I, JACOB DE S. FREUND, a citizen of the United States, residing at Edgewood Park, in the county of Allegheny and State of Pennsylvania, have invented certain new and useful Improvements in Charging Systems for Storage Cells or Batteries, of which the following is a specification.

My invention relates to charging systems for storage cells or batteries, and particularly to an automatic switch for use in such systems especially where the cells or batteries in the system are in multiple—as, for example, in automatic block railway signaling systems where the cells or batteries are employed as the source of power for the various motors, track-circuits, &c., used in the signaling system. The cells or batteries are generally arranged in sets or pairs, one set or pair discharging to provide power for said motors, track-circuits, &c., while the other set or pair is being recharged. The number of cells or batteries in a set may be any desired. Obviously, therefore, when one set of cells or batteries has discharged itself in furnishing the necessary power it becomes essential to include these cells or batteries in the charging-circuit, so that they may again be recharged, and that while they are being so recharged to include the other set of cells or batteries in the supply-circuit, thereby maintaining a continuity of current-supply and preventing all possibility of interruption thereof.

I will describe a charging-circuit for storage cells or batteries embodying my invention and then point out the novel features thereof in a claim.

In the accompanying drawings, Figure 1 is a diagrammatical view of a system for charging storage-cells embodying my invention. I have illustrated my invention in connection with a railway signaling system. Fig. 2 is an elevation of an automatic switch-operating device embodied in my invention. Fig. 3 is a plan view thereof. Fig. 4 is a diagrammatical view showing a manner of arranging the automatic switch between a pair of cells or batteries.

Similar reference characters designate corresponding parts in all the figures of the drawings.

In illustrating my invention in connection with a railway signaling system, as in Fig. 1, I do so for the purpose of showing a practical application in one form, and it must be understood that I do not limit myself to this application, as my invention covers and is capable of a wide range of adaptation and may be advantageously used under many conditions for charging storage cells.

Referring now to Fig. 1, A designates a portion of a railway divided by insulations *a* into a number of track-sections B C D, &c. A' designates a third rail. One or both of the tread or service rails may constitute the return to the source of power, which in this instance is in the form of a direct generator G, which is employed for supplying current to propel the motor-cars and also for charging the storage cells or batteries, although, as is well understood, such current for charging the storage batteries or cells may come from a different source: S S' S², &c., designate motors comprised in the mechanism for operating the signal devices of the railway-signals. B' B² B³, &c., designate storage cells or batteries or sets of such cells or batteries for supplying the power for said motors and for other electromagnetic devices and circuits comprised in the signaling system. The sets B' B² B³, &c., are those which are being discharged through a supply-circuit to the motors or any other mechanism or circuit to which they may be connected as a source of power and B⁵ B⁶ B⁷, &c., are those sets of cells which are cut out of the supply-circuit and are being charged. The cells or batteries B' B² B³, &c., or sets of cells or batteries are arranged in pairs, B' B⁵ being one pair, B² B⁶ another pair, and so on. As shown, there are two feed or line wires 4 5 extending from one pole of the generator, the return-line being the rail or rails of the railway. One feed-wire contains a cell or battery or set of cells or batteries of each pair of cells or batteries. A switch 2, located at the generator-station, for engaging either feed-wire is shown as being thrown to the position to engage a contact 3 in the feed-wire 4.

Arranged in series in the line-wire 4 are a plurality of magnets or solenoid-coils, which form one side of automatic switches. Similar magnet or solenoid coils are arranged in series in the feed-wire 5 and form the opposite sides of the automatic switches. An automatic switch comprising two magnet or solenoid coils and suitable contacts is placed at each pair or sets of cells—as, for example, between the sets B' B⁵ and B² B⁶, &c. (See Figs. 1 and 4.)

C' and C⁵ designate the magnet-coils of one switch, C² C⁶ the magnet-coils of another switch, C³ C⁷ the magnet-coils of still another switch, and so on. The coils C⁵ C⁶ C⁷ of the several switches are, as shown, being energized by the charging-current, and when so energized they act to close and keep closed the contacts x y of the several switches, Figs. 1 and 4, so that the storage cells or batteries B' B² B³, &c., may be included in the supply-circuit. Conversely, when the coils C' C² C³, &c., are energized the contacts w z of the several switches are closed, so that the storage cells or batteries B⁵ B⁶, &c., may be included in the supply-circuit. The closing of the one or the other of the sets of contacts x y w z just described includes the cells or batteries in one charging line in the supply-circuit and cuts out from the supply-circuit the opposite cells or batteries in the other line-wire and which are about to be charged. This is clearly shown in Figs. 1 and 4.

The switch for effecting the automatic change from one cell or set of cells onto the other cell or set of cells is more clearly shown in Figs. 2 and 3. It comprises, as stated, two magnet-coils or solenoids and suitable means operated by them for automatically opening and closing contacts included in the supply-circuit. The cores of the pair of the magnet-coils or solenoids are suitably connected with a lever m, pivoted intermediate its ends. The lever m has secured to its outer extremities the pairs of movable contacts x y and w z, which are properly insulated therefrom and from each other and which engage with stationary contacts o p and c d, also suitably insulated.

It will be seen from Fig. 2 that when one magnet-coil of a switch is energized the lever m is moved on its pivot to close one set of contacts—for example, x y and o p—and open the other set. Conversely, when the other magnet-coil is energized the open set of contacts w z and d c are closed and the closed set x y and o p are opened.

Referring now to Figs. 1 and 4, what I herein term the "supply-circuit" includes both pairs of movable contacts x y and w z and the electromagnetic device or circuits to be supplied with current from the storage batteries. This circuit in the example shown in these figures may be traced as follows: wire 20, wire 21, (common to movable contacts w and x,) wire 22, and wire 23, (common to movable contacts y and z.) This circuit, as shown, also includes a motor device S S', &c., of the railway signal mechanism. The stationary contacts o p are included in a circuit leading from the sets of cells B' B², &c., and the stationary contacts c d are included in a circuit leading from the sets of cells B⁵ B⁶, &c. Thus it will be seen that when the switch 2 is in the position shown in Fig. 1 the batteries B⁵ B⁶, &c., will be charged and the magnet-coils C⁵ C⁶, &c., energized to move their levers m to include the cells or batteries B', B², &c., in the supply-circuits, and when the switch 2 is moved to its other position (to engage line-wire 5) the cells or batteries B' B², &c., will be charged and the magnet-coils in that line energized to move their levers m, thereby cutting the cells or batteries B' B² out of the supply-circuit and the cells or batteries B⁵ B⁶, &c., into the supply-circuit.

The operation of my invention may be understood from the foregoing; but I may here add that the throwing of a switch at the generating-station in either direction will energize the magnet-coils in that particular line, the path of current being from the generator G or other source through the switch and through each set of cells in that line and the magnet-coils on one side of the switch devices and then to the return line back to the generator G.

Having thus described my invention, what I claim, and desire to secure by Letters Patent, is as follows:

In combination with a charging-generator, two feed-wires extending therefrom, storage cells or batteries included in each feed-wire, and arranged in pairs, magnet-coils in each feed-wire and arranged in pairs, one pair of magnet-coils being provided for each pair of storage cells or batteries, a pivoted lever for each pair of magnet-coils and alternately moved on its pivot by said magnet-coils, contacts opened and closed by the movement of each lever, and a supply-circuit for each pair of storage cells or batteries which is controlled by the movements of the pivoted lever of the magnet-coils provided for the pair of storage cells or batteries.

In testimony whereof I have signed my name to this specification in the presence of two subscribed witnesses.

JACOB DE S. FREUND.

Witnesses:
 DANIEL J. MCCARTHY,
 WALTER DICKSON.